US010365606B2

(12) United States Patent
Nguyen et al.

(10) Patent No.: US 10,365,606 B2
(45) Date of Patent: Jul. 30, 2019

(54) APPARATUS, OPTICAL SYSTEM, AND METHOD FOR DIGITAL HOLOGRAPHIC MICROSCOPY

(71) Applicants: Thanh Nguyen, Silver spring, MD (US); George Nehmetallah, Washington, DC (US); Vy Bui, Silver spring, MD (US)

(72) Inventors: Thanh Nguyen, Silver spring, MD (US); George Nehmetallah, Washington, DC (US); Vy Bui, Silver spring, MD (US)

( * ) Notice: Subject to any disclaimer, the term of this patent is extended or adjusted under 35 U.S.C. 154(b) by 0 days.

(21) Appl. No.: 15/947,801

(22) Filed: Apr. 7, 2018

(65) Prior Publication Data
US 2018/0292784 A1 Oct. 11, 2018

Related U.S. Application Data

(60) Provisional application No. 62/482,851, filed on Apr. 7, 2017.

(51) Int. Cl.
*G03H 1/00* (2006.01)
*G06N 3/02* (2006.01)
(Continued)

(52) U.S. Cl.
CPC ........... *G03H 1/0005* (2013.01); *G02B 21/18* (2013.01); *G02B 21/365* (2013.01); *G03H 1/0443* (2013.01); *G03H 1/0866* (2013.01); *G06N 3/02* (2013.01); *G06N 3/0454* (2013.01); *G06N 3/084* (2013.01); *G03H 2001/005* (2013.01);
(Continued)

(58) Field of Classification Search
CPC ........... G03H 1/0443; G03H 2001/005; G03H 1/0866; G03H 2210/12; G03H 2001/0875; G06N 3/02; G06N 3/0454; G02B 21/365; G02B 21/18
See application file for complete search history.

(56) References Cited

U.S. PATENT DOCUMENTS 8,665,504 B2 * 3/2014 Awatsuji .............. G03H 1/0443
                                            359/11
9,581,967 B1 * 2/2017 Krause ..................... G03H 1/32
(Continued)

OTHER PUBLICATIONS

Rui Cao et al.; "A Deep Convolutional Neural Network-Based Label Completion and Correction Strategy for Supervised Medical Image Learning"; IEEE; 2018 IEEE SmartWorld . . . ; Dec. 2018; pp. 1725-1730 (Year: 2018).*
(Continued)

*Primary Examiner* — John Villecco

(57) ABSTRACT

A digital holography microscope, a method, and a system are provided. The digital holography microscope comprising two microscope objectives configured in a bi-telecentric configuration; a sample holder configured to receive a sample; a couple charged device configured to capture one or more images; a display; and a processor configured to retrieve a Convolutional Neural Network (CNN) model associated with a type of the sample, mitigate aberrations in the one or more images using at least the CNN model having as input an unwrapped phase associated with each of the one or more images, and output the mitigated one or more images via the display.

17 Claims, 17 Drawing Sheets

(51) Int. Cl.
 G02B 21/18 (2006.01)
 G02B 21/36 (2006.01)
 G03H 1/08 (2006.01)
 G03H 1/04 (2006.01)
 G06N 3/04 (2006.01)
 G06N 3/08 (2006.01)

(52) U.S. Cl.
 CPC ............... G03H 2001/0033 (2013.01); G03H 2001/0456 (2013.01); G03H 2001/0875 (2013.01); G03H 2226/02 (2013.01)

(56) References Cited

U.S. PATENT DOCUMENTS

| | | | | |
|---|---|---|---|---|
| 10,078,305 | B2* | 9/2018 | Ulvestad | G03H 1/0866 |
| 10,176,363 | B2* | 1/2019 | El-Zehiry | G01N 15/1463 |
| 2017/0032285 | A1* | 2/2017 | Sharma | G06N 3/08 |
| 2017/0161545 | A1* | 6/2017 | Champlin | G06K 9/0014 |
| 2018/0061020 | A1* | 3/2018 | Hiasa | G06T 3/60 |
| 2019/0011882 | A1* | 1/2019 | Gusyatin | G03H 1/0866 |
| 2019/0025668 | A1* | 1/2019 | Tzang | G02F 1/365 |

OTHER PUBLICATIONS

Zhang et al.; "Beyond a Gaussian Denoiser: Residual Learning of Deep CNN for Image Denoising"; Jul. 2017; IEEE Transactions on Image Processing; vol. 26, No. 7; pp. 3142-3155 (Year: 2017).*
Nguyen et al.; "Computational Optical Tomography using 3-D Deep Convolutional Neural Networks"; Apr. 2018; SPIE (Year: 2018).*
Rivenson et al.; "Deep Learning Microscopy"; Nov. 2017; Optica; vol. 4, No. 11; pp. 1437-1443 (Year: 2017).*
Byeon et al.; "Deep Learning-based Dgital In-Line Holographic Microscopy for High Resolution with Extended Field of View"; May 2019; Optics and Laser Technology; 113:77-86 (Year: 2019).*
Pitkaaho et al.; "Focus Classification in Digital Holographic Microscopy Using Deep Convolutional Neural Networks"; Jul. 2017; Proceedings of SPIE; vol. 10414, p. 1-3, (Year: 2017).*

* cited by examiner

APPARATUS, OPTICAL SYSTEM, AND METHOD FOR DIGITAL HOLOGRAPHIC MICROSCOPY

CROSS-REFERENCE TO RELATED APPLICATIONS

This application claims the benefit of priority from U.S. Provisional Application No. 62/482,851 filed Apr. 7, 2017, the entire contents of which are incorporated herein by reference.

BACKGROUND

Three-dimensional image retrieving techniques are important for many applications. These techniques can roughly be divided into interferometric and non-interferometric techniques. Digital Holographic Microscopy (DHM) is an interferometric non-invasive technique for acquiring real-time quantitative phase images which has an enormous impact in many fields such as biology of living cells, neural science, nanoparticle tracking, biophotonics, bioengineering and biological processes, microfluidics, and metrology. A DHM system records a digital hologram optically using a microscope objective (MO) and the image reconstruction is performed digitally using optical propagation techniques, see, G. Nehmetallah, R. Aylo and L. Williams, *Analog and Digital Holography with MATLAB®*, SPIE Press, Bellingham, Wash., 2015, incorporated herein by reference in its entirety.

However, the use of an MO introduces phase aberrations which can be superposed over the biological sample (object). A successful image reconstruction requires very tedious alignment and precise measurement of the system parameters such as reference beam angle, reconstruction distance, and MO's focal length which are often difficult to achieve in a laboratory environment. To overcome these difficulties, the use of multiple-wavelength DHM and telecentric DHM configurations were employed which allowed canceling the bulk of optical phase aberration due to the MO and the reference beam. Residual aberrations could be compensated digitally by using Principal Components Analysis (PCA) or Zernike polynomial fitting (ZPF). However, as recognized by the present inventors, the use of multi-wavelength source makes the system setup more complicated and expensive. In addition, the existing digital compensation techniques still have other drawbacks, as recognized by the present inventors. The ZPF requires background information to find the phase residual which is detected semi-manually by cropping background area to perform the fitting. PCA, on the other hand, automatically predicts phase residual by creating a self-conjugated phase to compensate for the aberrations but assuming that the phase aberrations have only linear and spherical components and leaving higher order phase aberrations unaccounted for. Therefore, an automatic detection of the background areas in DHM would be highly desired. Many segmentation techniques have been proposed which can be divided into semi-automatic techniques such as active contour, region growing, graph cut, and random walker, which require predefined seeds, and fully automatic segmentation techniques such as edge-based, region-based, split and merge, and watershed techniques. However, in the case of DHM, these existing methods are not reliable because of the overwhelming phase aberrations and speckle noise in the images.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure relates to a digital holography microscope. The digital holography microscope comprising two microscope objectives configured in a bi-telecentric configuration; a sample holder configured to receive a sample; a couple charged device configured to capture one or more images; a display; and a processor configured to retrieve a Convolutional Neural Network (CNN) model associated with a type of the sample, mitigate aberrations in the one or more images using at least the CNN model having as input an unwrapped phase associated with each of the one or more images, and output the mitigated one or more images via the display.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
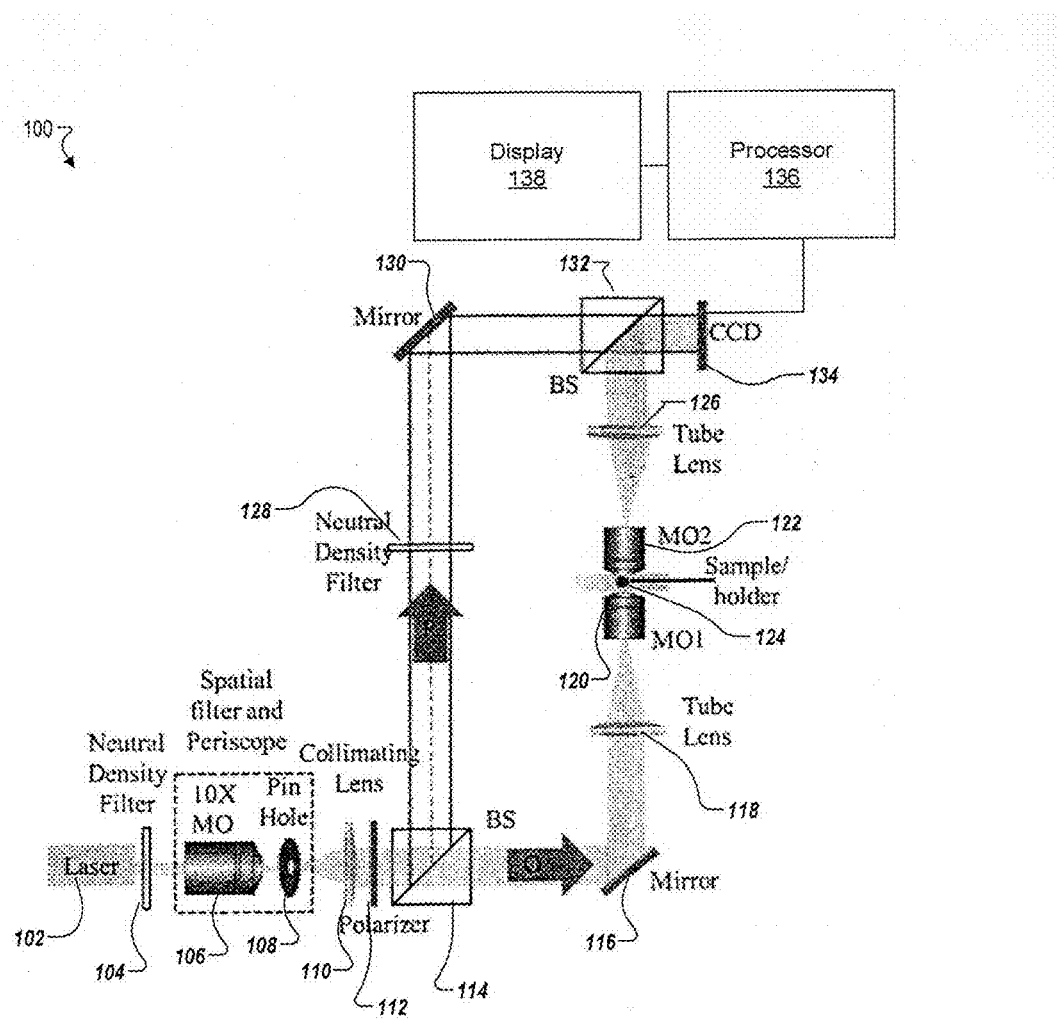
FIG. 1A is a schematic that shows a bi-telecentric digital holographic microscopy (BT-DHM) system according to one example.

Referring now to the drawings, wherein like reference numerals designate identical or corresponding parts throughout several views, the following description relates to an optical system and associated methodology for digital microscopy.

FIG. 1A is a schematic that shows a bi-telecentric digital holographic microscopy (BT-DHM) system 100 according to one example. In FIG. 1, the system 100 is shown in vertical transmission mode for biological sample analyses. In one implementation, the system 100 may be in a reflection mode configuration as would be understood by one of ordinary skill in the art.

Figure 1B:
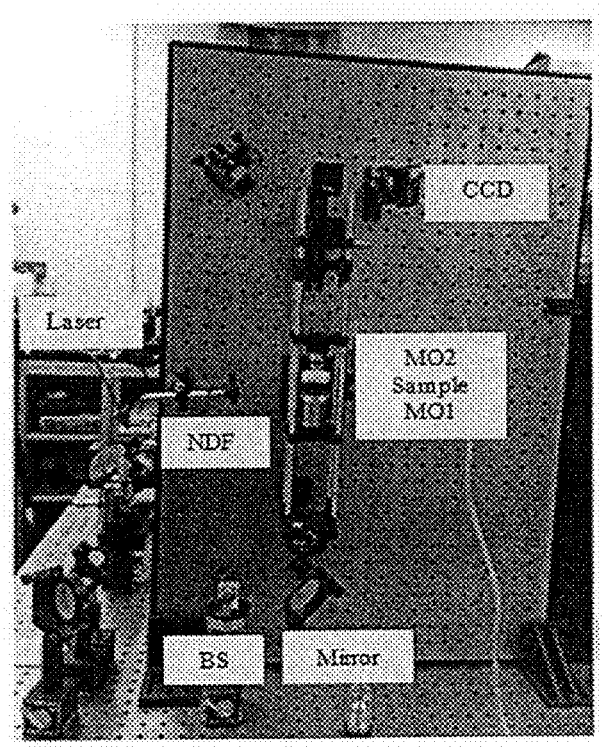
FIG. 1B is a schematic that shows a laboratory setup of system according to one example.

System 100 has an a focal configuration, where the back focal plane of the MO coincides with the front focal plane of the Tube lens ($f_o \equiv f_{TL}$), with the object placed at the front focal plane of the MO, resulting in the cancellation of the bulk of the spherical phase curvature normally present in traditional DHM systems. The optical beam from a laser 102 travels through a neutral density filter 104. In one example, the laser 102 is a HeNe laser. In other implementations, the laser may be a multiwavelength. Then, the optical beam travel through a spatial filter 106 (e.g., a microscope objective having a 10× magnification) and a periscope system 108 (e.g., a pin hole). Then, the beam is collimated with a collimating lens 110 to produce a plane wave beam. In one implementation, the collimated beam may be passed through a polarizer 112. The collimated beam is split into a reference beam and an object beam using a beam splitter 114 which is focused on the biological sample using an a focal configuration. The two beams which are tilted by a small angle (<1°) from each other are recombined using a second beam splitter 132 and interfere with each other on a couple charged device (CCD) 134 to generate an off-axis hologram. The magnification of the BT-DHM system 100 is $M = -f_{TL}/f_o$. The direction of the object beam may be altered using a mirror 116. Then, the beam may be passed through a first tube lens 118 and a first microscope objective 120 to focus the beam on a sample or a sample holder 124. Then, the beam is passed through a second microscope objective 122 and a second tube lens 126. The reference beam may be passed through a neutral density filter 128 and a mirror 130 to direct the beam to the second beam splitter 132. FIG. 1B is a schematic 138 that shows a laboratory setup of system 100. The system 100 may include additional optical elements such as mirrors, filters, and the like based on the packaging and spacing dimensions of the device as would be understood by one of ordinary skill in the art. The system 100 may also include a display 138 coupled to the processor 136.

The numerical reconstruction algorithms used in constructing digital holograms are the discrete Fresnel transform, the convolution approach, and the reconstruction by angular spectrum as described in G. Nehmetallah, and P. P. Banerjee, "Applications of digital and analog holography in 3D imaging," Adv. Opt. and Photon, 4(4), 472-553 (2012) incorporated herein by reference in its entirety.

$$H(f_x,f_y)=F[h(x,y)]=\iint_{-\infty}^{\infty} h(x,y)\exp\{-2\pi i(xf_x+yf_y)\}dxdy \quad (1)$$

$$U(f_x,f_y)=H(f_x,f_y)\exp(2\pi i f_z d) \quad (2)$$

$$u(\xi,\eta)=F^{-1}[U(f_x,f_y)]=\iint_{-\infty}^{\infty} U(f_x,f_y)\exp\{2\pi i(\xi f_x+\eta f_y)\}df_x df_y \quad (3)$$

where d is the distance between image plane and CCD, h(x,y) is the hologram, u(ξ,η) is the reconstructed image, F is the Fourier transform operator, λ is the wavelength, and $f_x, f_y, f_z = \sqrt{1/\lambda^2 - f_x^2 - f_y^2}$ are the spatial frequencies. The numerical reconstruction algorithms may be implemented by the processor 136.

In DHM a MO is introduced to increase the spatial resolution which may be calculated according to Eq. (4). Due to the magnification 'M' introduced by the MO the pixel size in the image plane, $\Delta\xi_{mag}$ and $\Delta\eta_{mag}$ scale according to:

$$\Delta\xi_{mag}=\lambda d/(N\Delta xM), \Delta\eta_{mag}=\Delta\eta/(N\Delta yM), \quad (4)$$

where N is the number of pixel in one dimension, and Δx, Δy denote the sampling intervals or pixel size Δx=Δy=L/N, L×L are the dimensions of the CCD sensor 134. The dimensions of the CCD 134 may be stored in a memory associated with the processor 136. The sampling intervals may be predefined and stored in the memory of the processor 136. In other implementations, the sampling intervals may be set by a user or determined by the processor 136 based on past results.

This is intuitively understood by realizing that the holographic recording is a recording of the geometrically magnified virtual image located at distance d. Thus, the pixel resolution is automatically scaled accordingly. For a transmissive phase object on/between transmissive surface/s, the phase change (optical thickness T) due to the change in index Δn can be calculated as:

$$T(\xi,\eta) = \frac{\lambda}{2\pi} \frac{\varphi_{ob}(\xi,\eta)}{\Delta n}. \quad (5)$$

where the phase due to the biological sample is expressed as:

$$\varphi_{ob}(\xi,\eta) = \varphi(\xi,\eta) - \frac{jk}{2R}(\xi^2 + \eta^2),$$

where R is the radius of curvature of the spherical curvature of the MO and φ(ξ,η) is the total phase of the object beam without using the bi-telecentric configuration.

Conventional image reconstruction using Eq. (3) contains phase aberrations which can be mitigated with the image reconstruction method described herein.

Figure 2:
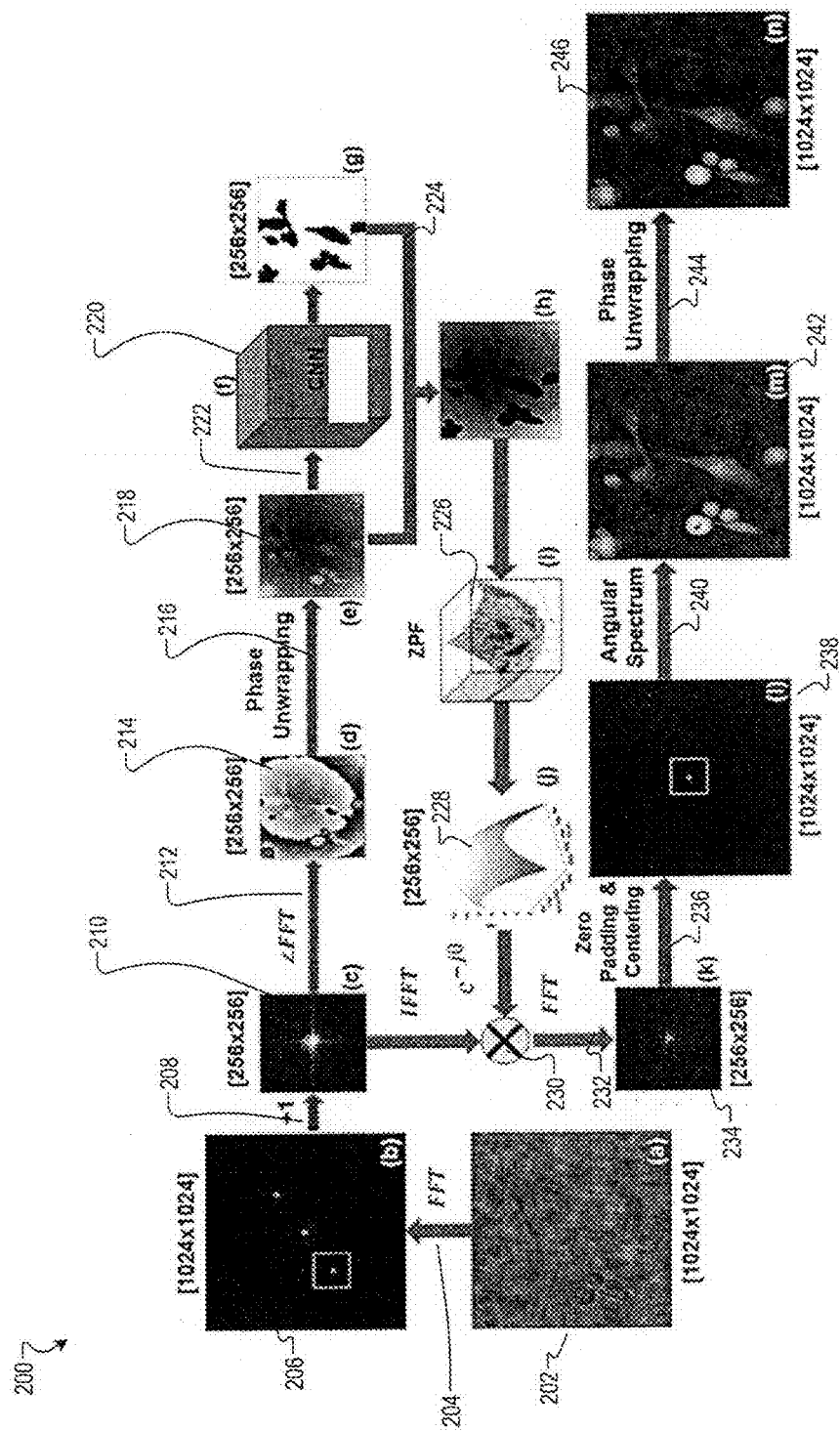
FIG. 2 is a flowchart that shows a process for mitigating phase aberrations according to one example.

FIG. 2 is a flowchart for a mitigating phase aberration process 200 according to one example. At step 204, the hologram 202 is converted into Fourier domain. Schematic 206 shows the hologram in the Fourier domain. At step 208, the +1 order component is extracted. Schematic 210 shows the +1 order component. At step 212, the wrapped phase image is obtained by extracting the phase of the inverse Fourier transform of the cropped spectrum. Schematic 214 shows the phase. At step 216, phase unwrapping is performed using sorting by reliability following non-continuous path as would be understood by one of ordinary skill in the art. The unwrapped phase 218 can be fed into a trained Convolutional Neural Network (CNN) model 220 to determine the background areas at step 222. At step 224, the unwrapped phase 218 and the binary mask 222 are combined to form the wrapped phase of the background only without the biological samples. At step 226, the background phase information is fed into the Zernike polynomial fitting (ZPF) to calculate the conjugated phase aberration. The conjugated phase aberration is shown in schematic 228. Phase compensation could be done in spatial domain by multiplying the Inverse Fourier Transform of the cropped +1 spectrum order with the complex exponential term which contains the conjugated phase aberration at step 230. At step 232, a Fourier transform of the compensated hologram is determined. The Fourier transform of the compensated hologram is shown in schematic 234. At step 236, the Fourier Transform of the compensated hologram is centered and zero padded to the original image size. The output is shown in schematic 238. At step 240, the angular spectrum reconstruction technique is performed to obtain the phase height distribution of the full-sized, aberration-free reconstructed hologram. The result is shown in schematic 242. At step 244, phase unwrapping is performed and the result is shown in schematic 246.

Training the CNN model 220 requires a training dataset of sub-sampled phase aberration images and their corresponding ground truth (label) images. Details of the data preparation steps for training the CNN model 220 and the implementation of the CNN model are described further below.

The cancer cells from the highly invasive MDA-MB-231 breast cancer cell line are seeded on type I collagen hydrogels, polymerized at 4 mg/ml and a temperature of 37° C. in 35 mm glass-bottomed petri dishes. The cells on collagen may be incubated for 24 hours in DMEM medium containing 10% fetal bovine serum, in standard tissue culture conditions of 37° C. and 5% $CO_2$, and 100% humidity. Then, cells are taken from the incubator and imaged with the bi-telecentric DHM system 100 described above to produce phase reconstruction maps.

Figure 3:
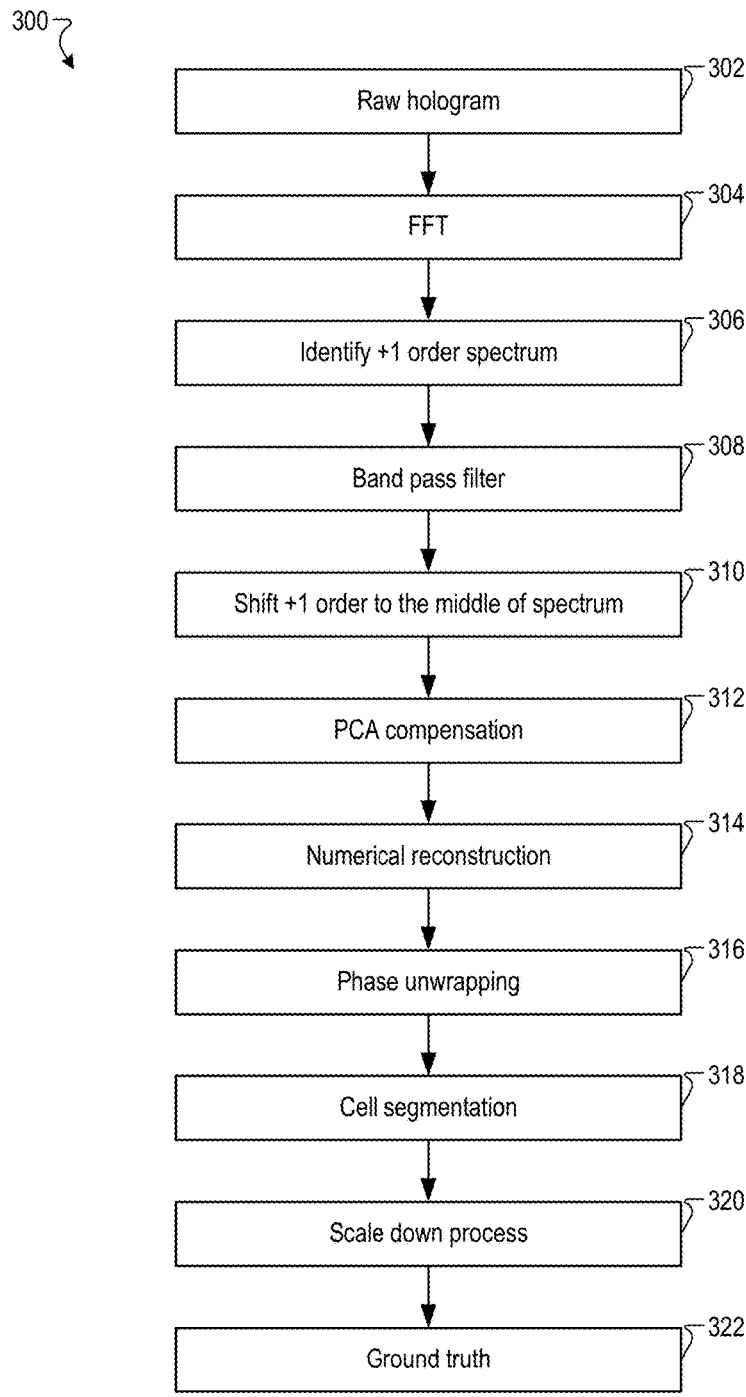
FIG. 3 is a flowchart that shows a process for single cell segmentations and binary masks according to one example.
Figure 4:
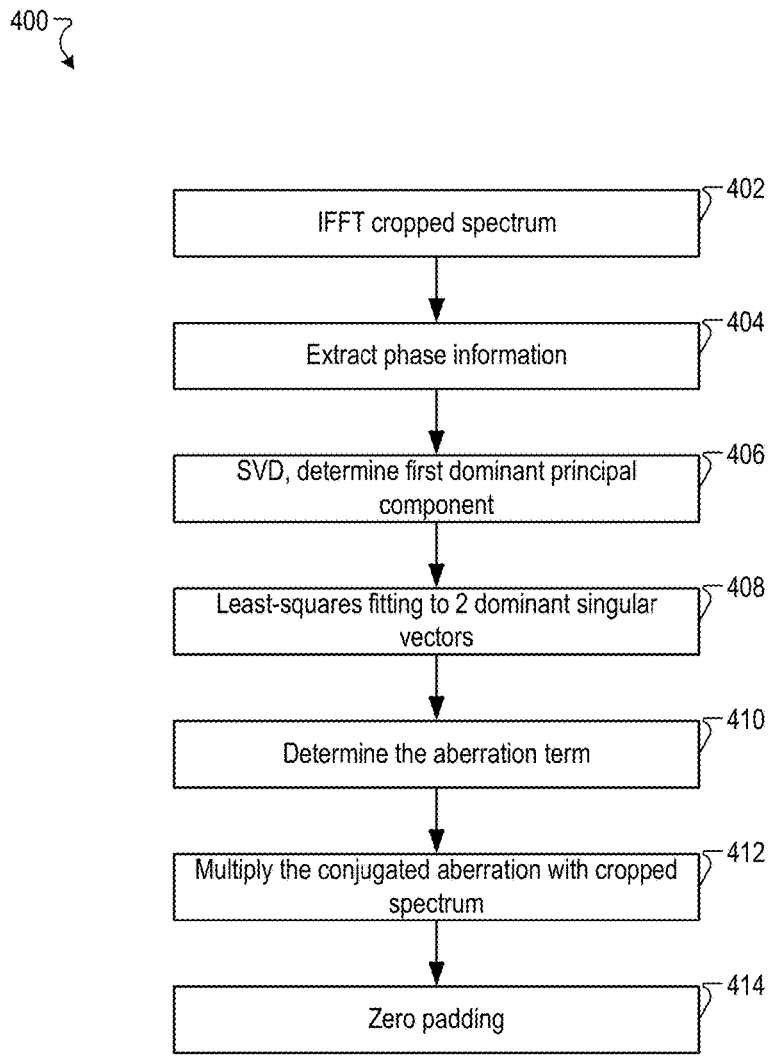
FIG. 4 is a flowchart that shows a process for a principal components analysis process according to one example.

FIG. 3 is a flowchart that shows a process 300 for single cell segmentations and binary masks according to one example. The process 300 may be implemented using the processor 136. At step 302, a raw hologram is obtained. At step 304, the Fourier transform of the raw hologram is obtained. At step 306, the +1 order spectrum is identified. Then, a band pass filter is applied to the +1 order at step 308. At step 310, the +1 order is shifted to the middle of the spectrum. At step 312, a PCA compensation is implemented. An exemplary PCA compensation technique is shown in FIG. 4. At step 314, numerical reconstruction is performed. At step 316, the processor may perform phase unwrapping. At step 318, cell segmentation is performed. At step 320, a scale down process is processed. At step 322, the ground truth is obtained.

Forty holograms containing cancer cells were also reconstructed using the PCA method. For the training stage of the deep-learning CNN, 306 single cells were manually segmented from those forty reconstructed holograms to obtain real phase distribution images and corresponding ground truth binary images (0 for background, 1 for cells). Then, each of cell's phase distribution images, binary masks and subsampled phase aberration images were augmented using flipping (horizontally and vertically) and rotating (90°, 180°, and 270°). Therefore, 1836 single cell phase distribution images, corresponding to 1836 single cell binary masks and 1260 sub-sampled background phase aberration were obtained. In order to create the training data set, 4-10 real phase maps of cells were randomly added into each of the 1260 phase aberration images that contain no samples at random positions. It should be noted that the total phase is the integral of the optical path length (OPL). These phase maps were preprocessed with a moving average filter [5×5] to smooth out the edges due to the manual segmentation. Similarly, and corresponding to the same 4-10 random positions of the real phase maps, the ground truth binary masks were added to a zero background phase map to create the labeled dataset. Notice that, different types of cells can produce different shapes. In one implementation, a future objective would be to quantitatively assess the growth and migratory behavior of invasive cancer cells, and hence cells from the invasive MDA-MB-231 breast cancer line were used for this purpose.

Note that, for each type of cells, manual segmentation is only performed once. Hence, the manual segmentation is only performed in the data preparation stage. Usually, deep learning CNN techniques require a certain amount of training data to produce good results. This additional overhead to collect and prepare the training data can be expensive. However, by augmenting 210 phase images (without sample present) and 310 cell images through flipping and rotation, a training dataset of 1260 phase aberration images and their corresponding ground truths images is created. Eighty percent of these images were randomly selected for training, and the rest of images were used for validation.

FIG. 4 is a flowchart that shows a process 400 for a principal components analysis process according to one example. At step 402, the processor 136 may determine the inverse Fourier transform on the spectrum. At step 404, the processor 136 performs a phase extraction. At step 406, the processor 136 may determine the first dominant principal component using singular value decomposition (SVD). At step 408, the processor 136 may perform a lease square fitting for the two dominant singular vectors. At step 410, the aberration term is determined. At step 412, the conjugate of the aberration term is multiplied with the cropped spectrum. At step 414, a zero padding is performed.

Figure 5:
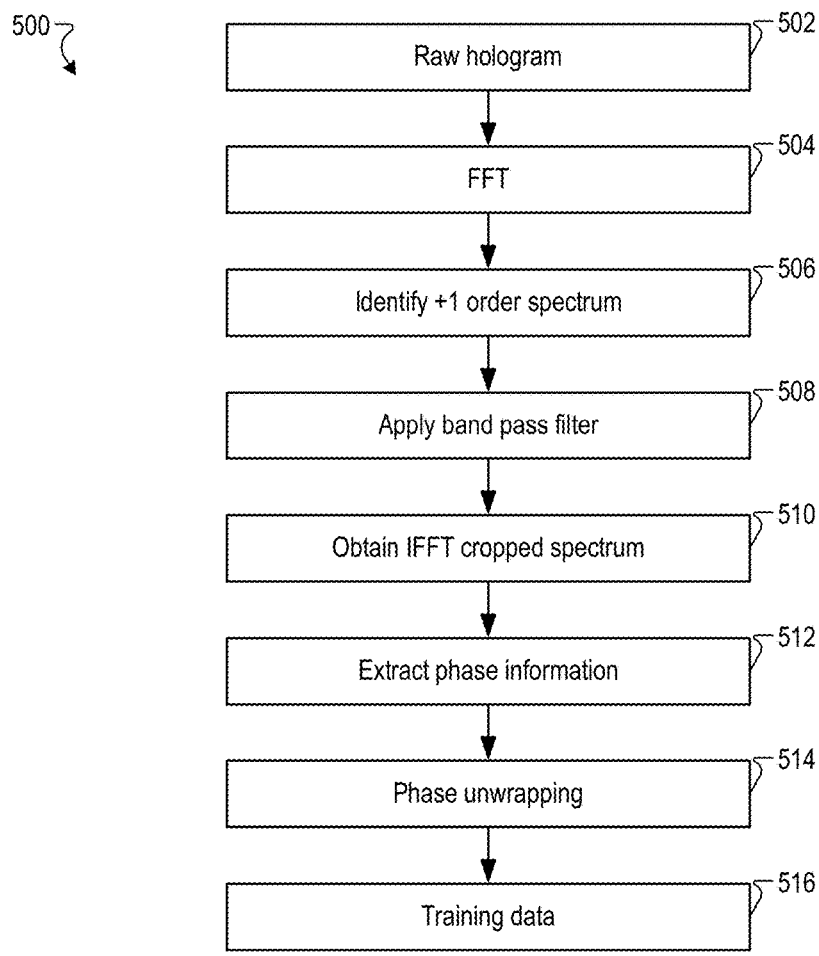
FIG. 5 is a flowchart that shows a process for obtaining sub-sampled phase aberration according to one example.

FIG. 5 is a flowchart that shows a process 500 for obtaining random background (i.e., where no sample is present) sub-sampled phase aberration according to one example. At step 502, a raw hologram is obtained. At step 504, the Fourier transform of the raw hologram is obtained. At step 506, the +1 order spectrum is identified. Then, a band pass filter is applied to the +1 order at step 508. At step 510, an inverse Fourier transform is applied to the +1 order cropped spectrum obtained at step 508. At step 512, the processor 136 may extract the phase information. At step 514, the processor 136 may perform phase unwrapping to obtain the training data 516.

In one example, process 500 is implemented to obtain Random background phase aberration when no sample is present in the system 100. The first microscope objective 120 and the second microscope objective 122 are both shifted up, down, and rotated to create different phase aberrations. Two-hundred and ten holograms without a sample present are captured and reconstructed, using angular spectrum method. The background sub-sampled (256× 256) phase aberration are reconstructed after using a bandpass filter around the +1 order (virtual image location) by using an inverse Fourier transform and phase unwrapping.

Figure 6:
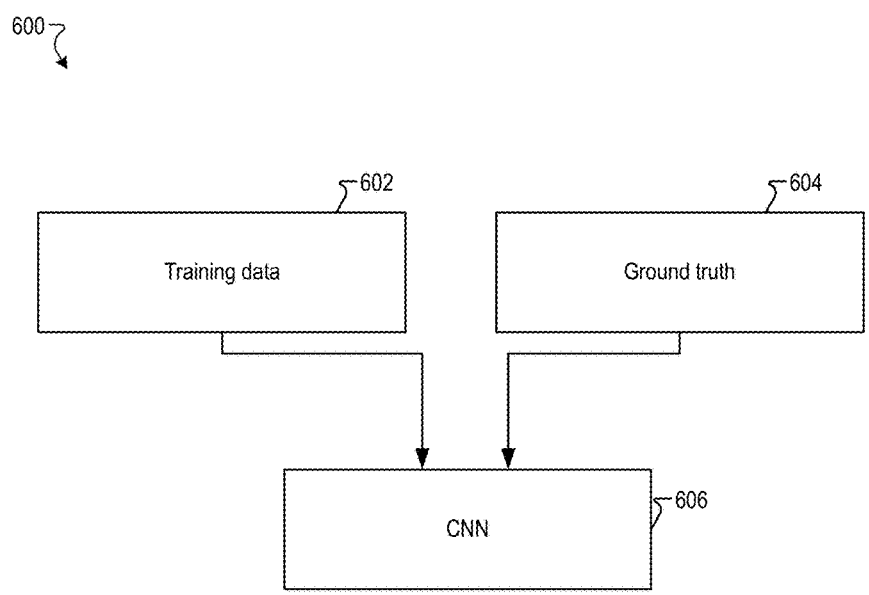
FIG. 6 is a flowchart that shows a process for inputting data in a convolutional neural network model according to one example.

FIG. 6 is a flowchart that shows a process 600 for inputting data in a convolutional neural network model according to one example. The training data 602 and the ground truth 604 are fed to the CNN model 606. In one implementation, the training data 602 are obtained using process 500 described in FIG. 5 and the ground truth 604 is obtained using process 300 described in FIG. 3.

Figure 7:
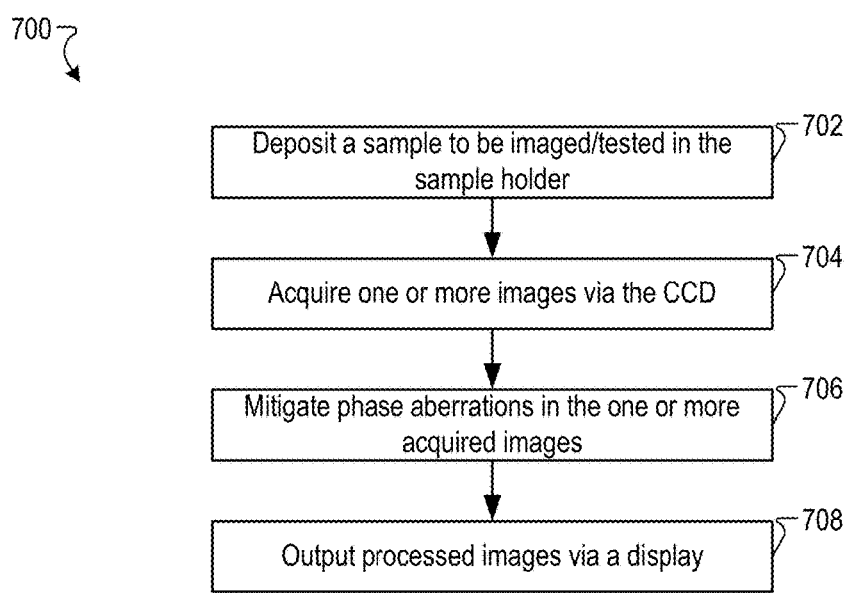
FIG. 7 is a flowchart for image acquisition using a digital holography microscope according to one example.

FIG. 7 is a flowchart for an image acquisition process 700 using the digital holography microscope described herein according to one example. A sample may be deposited or provided in the sample holder 124. At step 702, one or more images (i.e., holograms) are captured by the CCD 134. At step 704, the CNN model associated with a type of the sample may be retrieved from the memory. The CNN model may be determined using process 600 of FIG. 6. At step 706, process 200 shown in FIG. 2 may be implemented by the processor 136 using the CNN model retrieved at step 704 (i.e., CNN model 220 of FIG. 2). At step 708, the image is output via the display 138. The image may also be provided to one or more third party applications. For example, processes to detect cancer cells may be implemented using the aberration-less image.

The implementation of deep learning CNN for automatic background detection for digital holographic microscopic images is described next. The deep learning architecture contains multiple convolutional neural network layers, including max pooling layers, unpooling layers with rectified linear unit (ReLU) activation function and batch normalization (BN) function, similar to the architecture used described in O. Ronneberger, P. Fischer, and T. Brox, "U-net: Convolutional networks for biomedical image segmentation," *International Conference on Medical Image Computing and Computer Assisted Intervention*, Springer International Publishing, 18 May (2015) incorporated herein by reference in its entirety. Let us denote by $x^{(i)}$, $x'^{(i)}$ and $y^{(i)}$ to be the input data volume (correspond to the initial group of phase aberration images), the currently observed volume data at a certain stage of the CNN model, and the output data volume of the CNN model, respectively. The input and output data volume along with the ground truth images have a size of (batchSize×imageWidth×imageHeight×channel), where batchSize is the number of the images in each training session. In the model described herein, the input volume has a size (8×128×128×1) (1 channel indicates a grayscale image), whereas the output volume has a size (8×128×128×2) (2 channels for 2 classes obtained from the one-hot-encoding of the ground truth images). An output neuron in the U-net model is calculated through convolution operations (i.e., defined as a convolution layer) with the preceding neurons connected to it such that these input neurons are situated in a local spatial region of the input. Specifically, each output neuron in a neuron layer is computed by the dot product between their weights and a connected small region of the input volume, with an addition of the neuron bias:

$$x'^{(i)}_l = \sum_{j=0}^{M} W_l^{(j)} x'^{(j)}_{l-1} + B_l^{(j)}, i=1,2,\ldots,N, \quad (6)$$

where W is the weight, B is the bias, j is the index in the local spatial region M which is the total number of elements in that region, N is the total number of neurons in each layer which can be changed depending on the architecture, and l is the layer number.

Figure 8:
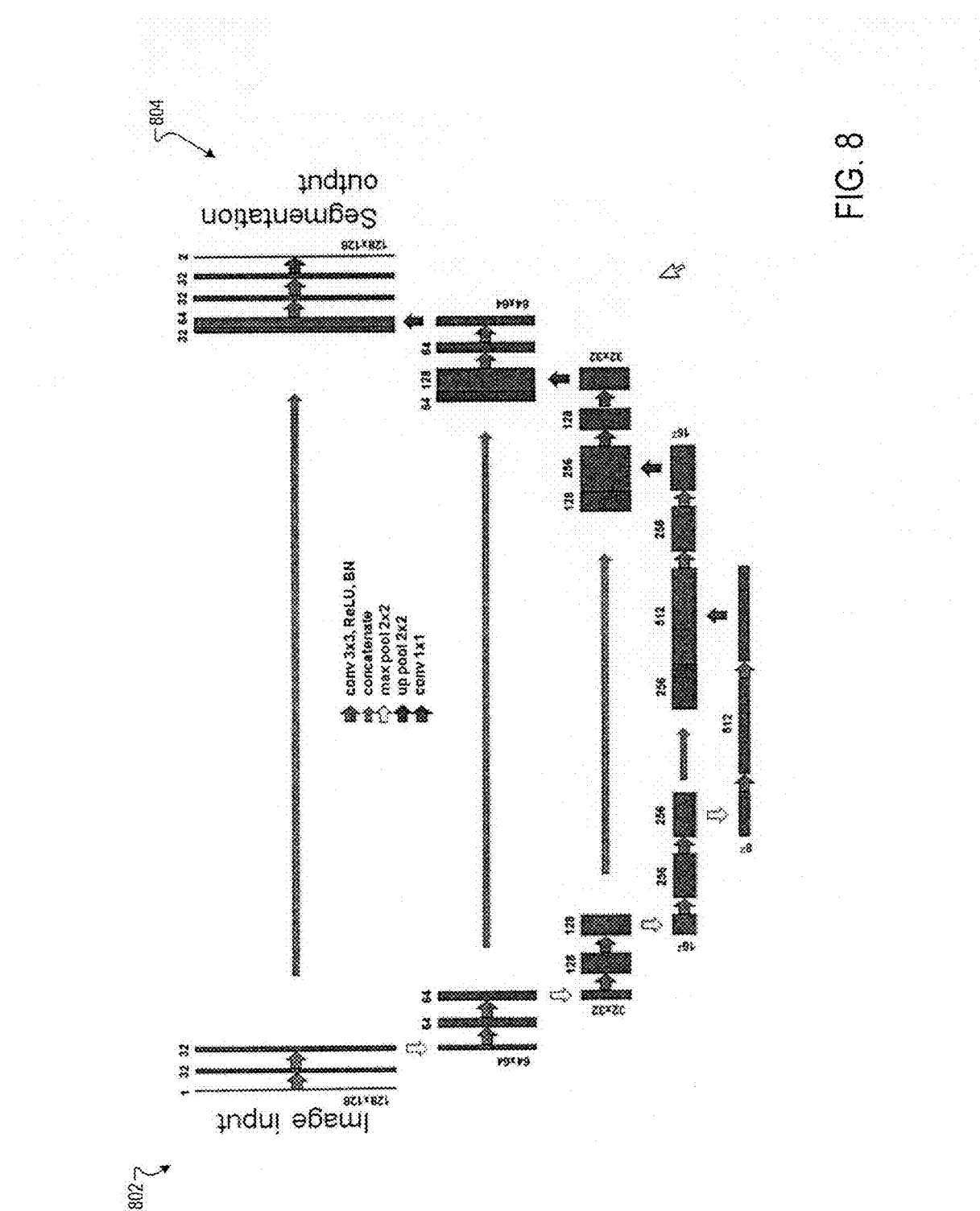
FIG. 8 is a schematic that shows a U-net Convolutional Neural Network (CNN) model according to one example.

The U-net model contains two parts: Down-sampling (Indicated by 802 in FIG. 8) and up-sampling (indicated by 804 in FIG. 8). After each convolutional layer, ReLU activation function and BN function are applied to effectively capture non-linearities in data and speedup the training. In the down-sampling path, convolution performs feature extraction which transforms the input image to a multi-dimensional feature representation. On the other hand, the up-sampling path is a shape generator that produces object segmentation from the extracted features from the convolution path. ReLU activation improves the computational speed of the training stage of the neural networks and prevents the issue of "vanishing gradient" while employing the sigmoidal function traditionally used for this purpose. The ReLU activation function used is defined as:

$$f(x'^{(i)}) = \begin{cases} x'^{(i)}, & \text{if } x'^{(i)} > 0 \\ 0, & \text{otherwise} \end{cases}, i = 1, 2, \ldots, N, \quad (7)$$

where $x'^{(i)}$ is the $i^{th}$ pixel in the volume data under training, N is the total number of pixels in the volume data: N=batchSize×layerwidth×layerheight×channel, where layerwidth and layerheight is the width and height of the image at the $l^{th}$ layer, and the channel is the number of weights W in the $l^{th}$ layer. Other activation functions may be used as would be understood by one of ordinary skill in the art.

On the other hand, batch normalization allows the system to: (a) have much higher learning rates, (b) be less sensitive to the initialization conditions, and (c) reduce the internal covariate shift. BN can be implemented by normalizing the data volume to make it zero mean and unit variance as defined in Eq. (8):

$$\widehat{x'}^{(i)} = \gamma \frac{x'^{(i)} - \mu[x'^{(i)}]}{\sqrt{\sigma^2 + \epsilon}} + \beta, \quad (8)$$

where $$\mu[x'] = \frac{1}{N} \sum_{i=1}^{N} x'^{(i)}, \sigma^2 = \frac{1}{N} \sum_{i=1}^{N} (x'^{(i)} - \mu[x'^{(i)}])^2,$$

$\in$ is a regularization parameter to avoid the case of uniform images), $\gamma$ is a scaling factor, $\beta$ is the shifting factor ($\gamma$=1, $\beta$=0), and $\widehat{x'}^{(i)}$ is the output of the BN stage.

The down-sampling and up-sampling may be done using max pooling and unpooling, respectively. Max pooling is a form of non-linear down-sampling that eliminates non-maximal values, and helps in reducing the computational complexity of upper layers by reducing the dimensionality of the intermediate layers. Also, max pooling may be done in part to avoid over fitting. The unpooling operation is a non-linear form of up sampling a previous layer by using nearest neighbor interpolation of the features obtained by max pooling, and resulting gradually shape of samples. The deep learning CNN model described herein has a symmetrical architecture with max pooling and unpooling filters both with a 2×2 kernel size.

In one implementation, the Softmax function, a linear classifier defined in Eq. (9), is used in the last layer to calculate the prediction probability of background/cell potential as:

$$S(y^{(i)}) = \frac{e^{y^{(i)}}}{\sum_{i=1}^{N} e^{y^{(i)}}}, \text{ for } i = 1, 2, \ldots, N, \quad (9)$$

where N(8×128×128×2) is the number of pixels (neurons) needed to be classified in the segmentation process.

An error is a discrepancy measure between the output produced by the system and the correct output for an input pattern. A loss value is the average of errors between the predicted probability $S(y^{(i)})$ and the corresponding ground truth pixel $L^{(i)}$. The loss function is measured by using the cross entropy function which is defined as:

$$\epsilon = -\frac{1}{N}\sum_{i=1}^{N} L^{(i)}\log(S(y^{(i)})). \quad (10)$$

The training is performed by the processor 136 by iterating the process of feeding the phase aberration images in batches through the model and calculating the error $\epsilon$ using an optimizer to minimize the error. The Stochastic Gradient Descent (SGD) optimizer is employed in the back propagation algorithm. Instead of evaluating the cost and the gradients over the full training set, the processor 136 evaluates the values of these parameters using less training samples. The learning rate was initially set to 1e-2, the decay to 1e-6, and the momentum to 0.96. Other parameters used in one example are: batchsize of 8, image size of 128×128 instead of 256×256 to avoid memory overflow (images may be resized at the end of the process), depth channel of 32 at the first layer, the deepest channel is 512, and training with 360 epochs. The model described herein was implemented in Python using TensorFlow/Keras framework and the implementation was GPU-accelerated with NVIDIA GeForce 970M.

Figure 9:
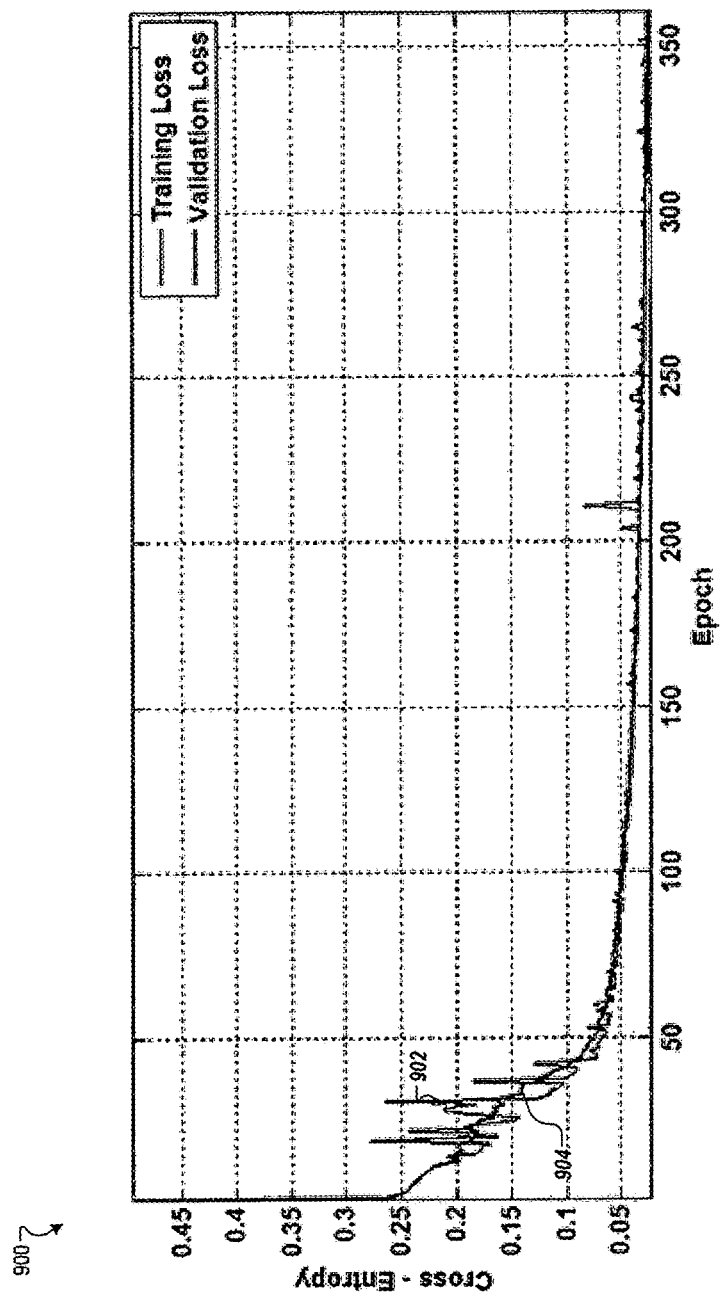
FIG. 9 is a schematic that shows exemplary results according to one example.

FIG. 9 is a schematic 900 that shows exemplary results according to one example. Trace 902 shows the validation loss obtained from 360 epochs. Trace 904 shows the training loss obtained from 360 epochs. Each epoch contains 120 batches of training data. The parameters were updated after each training batch. The training loss and the validation loss started at 0.48 and 0.2916, respectively. The results suggest that the loss value decreases quickly (i.e., learned quickly) during the first 50 epochs of the training, and the validation loss value decreases with random oscillations (i.e., transitory period) in the first 50 epochs. Note that the validation loss value was slightly less than the value of the training loss value during epoch 50 to 220 which implies that the model described herein learned slowly in this period. Between epochs 220 and 360 the validation loss value was slightly higher than the training loss value. Both values decreased slowly to 0.0256 and 0.0237, respectively.

To evaluate the performance of the deep neural network and ZPF technique described herein, 30 holograms recorded by the system 100 and reconstructed using the process 200 shown in FIG. 2, are tested. The background of a phase aberration image was first located, so the background pixel representation can be used in the ZPF model. The unwrapped phase is passed through the trained CNN model (i.e., step 220 in FIG. 2) to produce the mask prediction $y^{(i)}$ in Eq. (9). The output of the model is normalized in the [0, 1] range and the threshold is set to 0.5 to classify the background and cell area as described by the following equation:

$$B^{(i)} = \begin{cases} 1, & \text{if } y^{(i)} \leq 0.5 \\ 0, & \text{otherwise} \end{cases}, i = 1, 2, \ldots, N. \quad (11)$$

Figure 10:
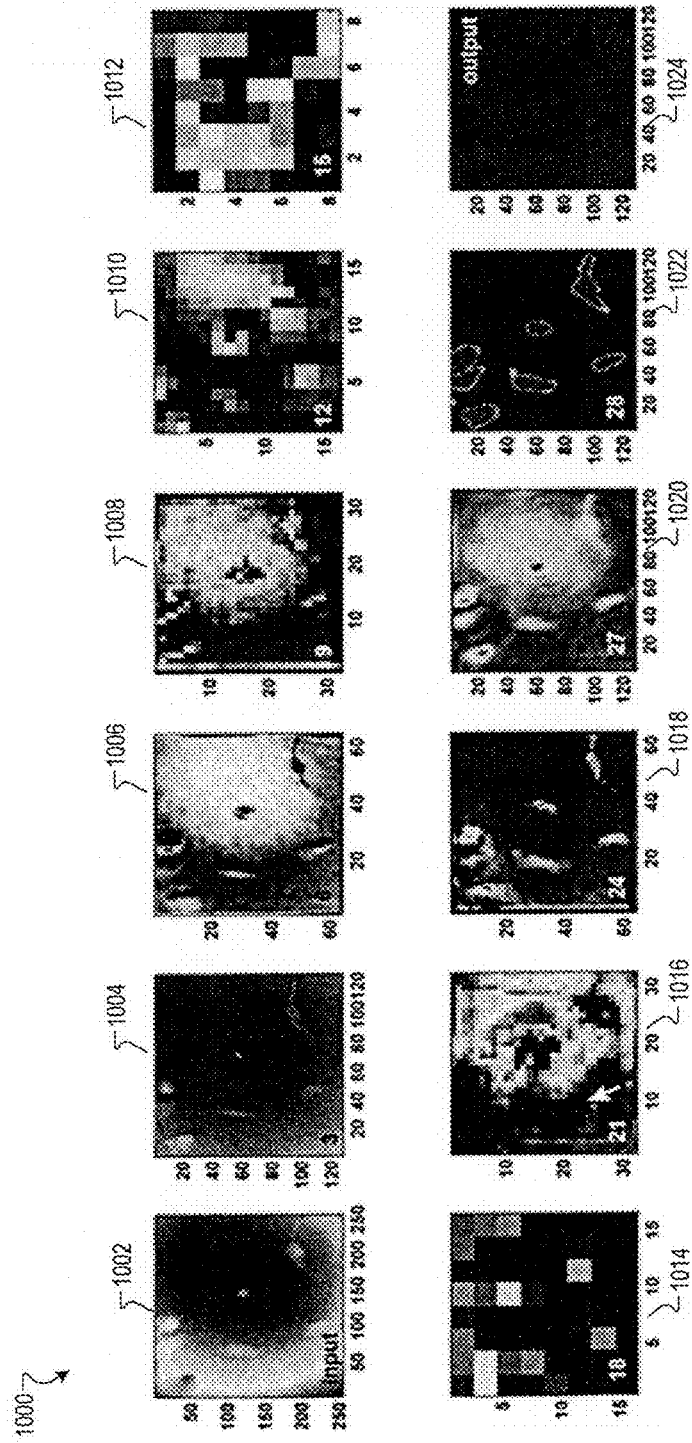
FIG. 10 is a schematic that shows outputs of a selected channel from a plurality of layers of the CNN model according to one example.

FIG. 10 is a schematic 1000 that shows outputs of a selected channel from a plurality of layers of the CNN model according to one example. Image 1002 is the raw phase aberration. Images 1004, 1006, 1008, 1010, and 1012 are the outputs of consecutive down-sampling layers (802 of FIG. 8). Images 1014, 1016, 1018, 1020, and 1022 are the outputs of exemplary up-sampled layers (804 of FIG. 8). Image 1024 is the binary mask using the threshold function defined in Eq. (11). The down-sampled layers contain the strong features of the image such as the parabolic intensities and edges, while the up-sampled layers contain the shape of the cells.

In order to measure the conjugated background phase aberration, the pixels from the raw phase image are selected by the processor 136 corresponding to the background pixels' locations obtained from the binary image where ($BC^{(i)}=1$), then converted to a 1D vector to perform the polynomial fitting. Then, the polynomial fitting is implemented using a $5^{th}$ order polynomial with 21 coefficients as:

$$S(x,y) = \sum_{i=0}^{5}\sum_{j=0}^{5} p_{ij} x^i y^j, i+j \leq 5, \quad (12)$$

where $p_{ij}$ are the coefficients, i and j are polynomial orders, x and y present pixel coordinates. Let the arrays $P=[p_{00}\ p_{10} \ldots p_{ij} \ldots p_{05}]$ and $A=[a_0\ a_1 \ldots a_{10} \ldots a_{20}]$, hold the polynomial model's coefficients and the Zernike model's coefficients.

The 21 coefficients of the P polynomial are used to calculate the coefficients of the Zernike polynomial as shown in the following equation:

$$A = z_{i,j,p}^{-1} \cdot P. \quad (13)$$

The $z_{i,j,p}$ matrix consists of coefficients corresponding to each order of the Zernike polynomials:

$$\begin{bmatrix} a_0 \\ a_1 \\ \vdots \\ a_{10} \\ \vdots \\ a_{20} \end{bmatrix} = \begin{bmatrix} z_{0,0,0} & z_{0,0,1} & \cdots & z_{0,0,10} & \cdots & z_{0,0,p-1} & z_{0,0,p} \\ z_{1,0,0} & z_{1,0,1} & \cdots & z_{1,0,10} & \cdots & z_{1,0,p-1} & z_{1,0,p} \\ \vdots & \vdots & \ddots & \vdots & \ddots & \vdots & \vdots \\ z_{4,0,0} & z_{4,0,1} & \cdots & z_{4,0,10} & \cdots & z_{4,0,p-1} & z_{4,0,p} \\ \vdots & \vdots & \ddots & \vdots & \ddots & \vdots & \vdots \\ z_{0,5,0} & z_{0,5,1} & \cdots & z_{0,5,10} & \cdots & z_{0,5,p-1} & z_{0,5,p} \end{bmatrix}_{p=20}^{-1} \times \begin{bmatrix} p_{00} \\ p_{10} \\ \vdots \\ p_{40} \\ \vdots \\ p_{05} \end{bmatrix}, \quad (14)$$

The Zernike polynomial model is used to construct the conjugated phase, as:

$$P_{conjugated} = \exp(-j\sum_{k=0}^{20} a_k Z_k), k=1,2,\ldots,21 \quad (15)$$

where $Z_k$ coefficients are expressed according to Zemax® classification.

After obtaining the background area from CNN, the conjugated phase aberration may be calculated using ZPF, and then multiplied with the initial phase. To obtain the full size aberration compensated reconstructed image, zero padding and spectrum centering is performed on the Fourier transform of the aberration compensated hologram. Then, the angular spectrum reconstruction technique is performed to obtain the phase height distribution of the full-sized, aberration-free reconstructed hologram, as shown in FIG. 2.

Figure 11:
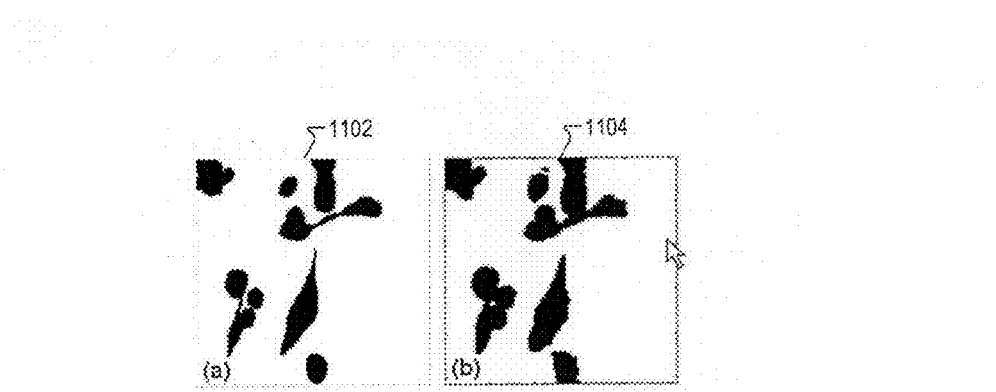
FIG. 11 is a schematic that shows manual segmentation and CNN model's segmentation of a test image according to one example.
Figure 12:
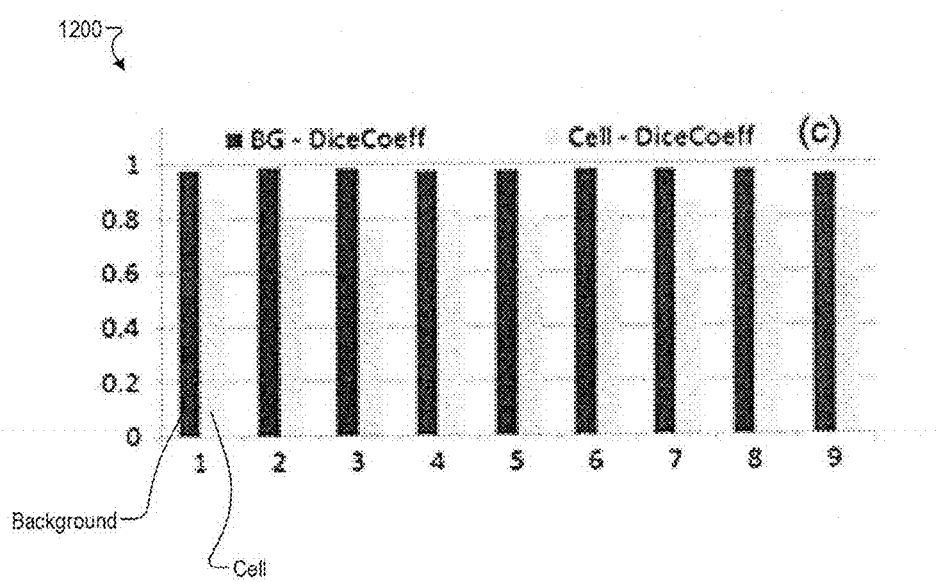
FIG. 12 is a schematic that shows a background dice coefficient and the cell dice coefficient for a plurality of test data according to one example.

Schematic 1102 and schematic 1104 of FIG. 11 show a typical manual and CNN model's segmentation on the test image of FIG. 10 (i.e., image 1002) Schematic 1200 of FIG. 12 shows the Dice's Coefficient (DC) or F1 score of background area and cell area of 9 typical cases in test data. DC is computed according to the following equation:

$$DC = \frac{2|A \cap A'|}{|A| + |A'|} \quad (16)$$

where |.| denotes the area, A and A' are the segmented areas of a test data based on deep learning CNN and manual segmentation, respectively.

Background's DC (0.9582-0.9898) is much higher than cell's DC (0.7491-0.8764) because of the larger common area in the background. This lessen the effect of true negative and false positive scenarios in ZPF.

Figure 13:
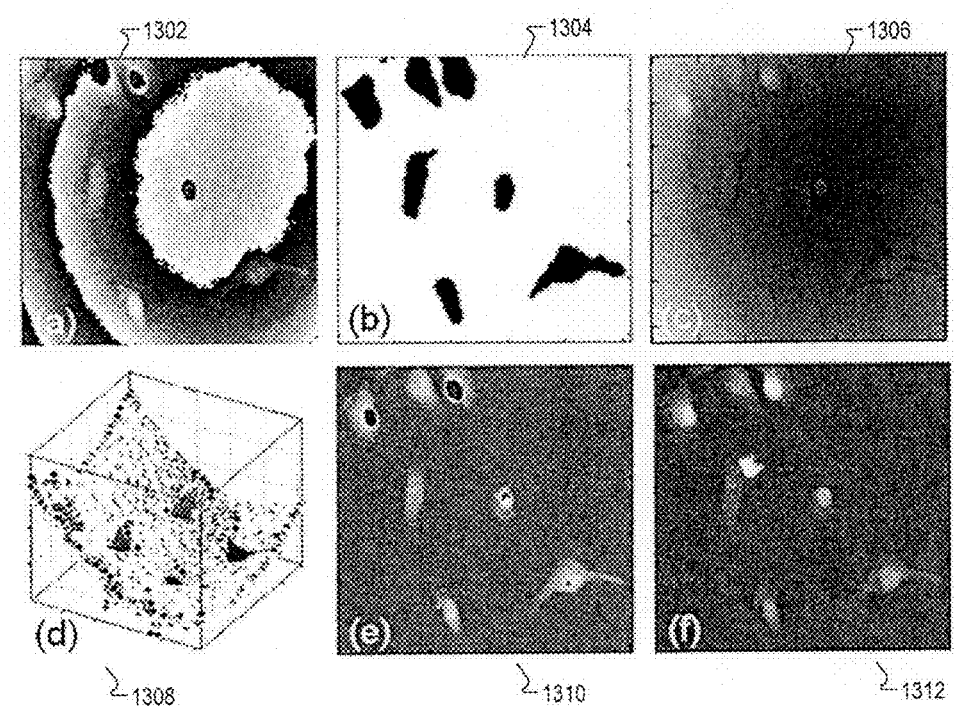
FIG. 13 is a schematic that shows exemplary results according to one example.

Schematic 1302 of FIG. 13 shows a typical real reconstructed wrapped phase with aberrations. It is worth noting that the cells in this image do not appear in the training dataset. This means that these holograms were not segmented in the data preparation process. Schematic 1304 of FIG. 13 shows the result of background detection using the deep learning CNN classification process. In this example, considerable differences between the training data and the real data were observed. Cells obtained from real data have smoother edges than the ones obtained in the training data. The CNN produces an intentional over segmentation of the cell area which is actually beneficial for background detection. Schematic 1306 of FIG. 13 is the result of applying (through multiplication) the binary mask on the unwrapped reconstructed phase containing aberrations. Then the phase aberration in the background region was fitted using ZPF to compute the residual phase as shown in schematic 1308 of FIG. 13. Schematic 1310 shows the phase distribution after compensating in the spatial domain according to FIG. 6. Schematic 1312 shows the final result after phase unwrapping.

Figure 14A:
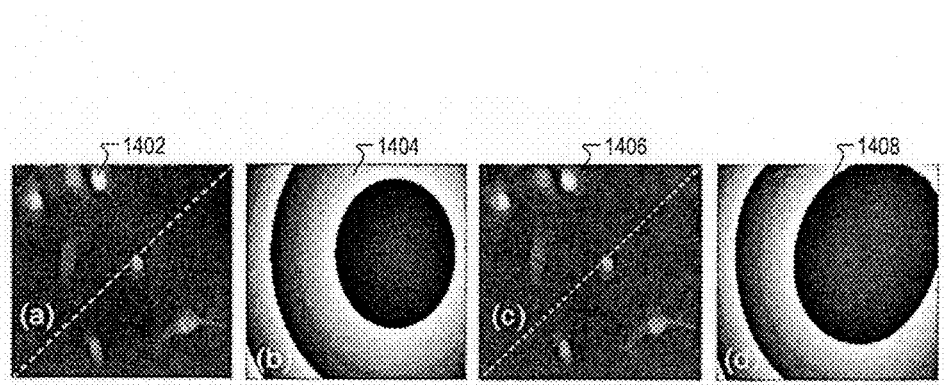
FIGS. 14A-C are schematic that show exemplary results according to one example.

FIG. 14A shows the comparison between PCA and CNN+ZPF techniques according to one example. The CNN+ZPF technique produces better results than the PCA technique in approximating the conjugated residual phase. Schematics 1402 and 1406 show the phase compensation using PCA and CNN+ZPF, respectively. Schematic 1404 and 1406 are the wrapped conjugated residual phases computed using PCA and CNN+ZPF, respectively. When the PCA's technique is implemented, the residual phase which contains elliptical concentric pattern was fitted using the least-square method for the two dominant singular vectors corresponding to the first two dominant principal components. This will not compensate for all the distorted regions of the phase distribution.

Figure 14B:
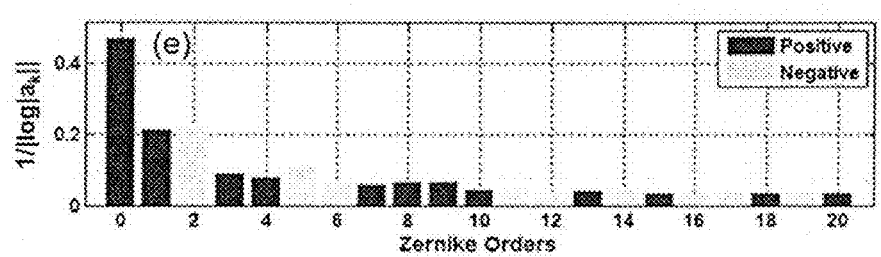

However, the CNN+ZPF technique takes advantage of the background area; the majority of background information was fitted with higher order (up to $5^{th}$ order). Hence, the conjugated phase aberration looks more distorted because of those higher orders. FIG. 14B shows the Zernike coefficients of the phase difference between CNN+ZPF method and PCA method indicating the error in phase compensation while using the PCA method.

Figure 14C:
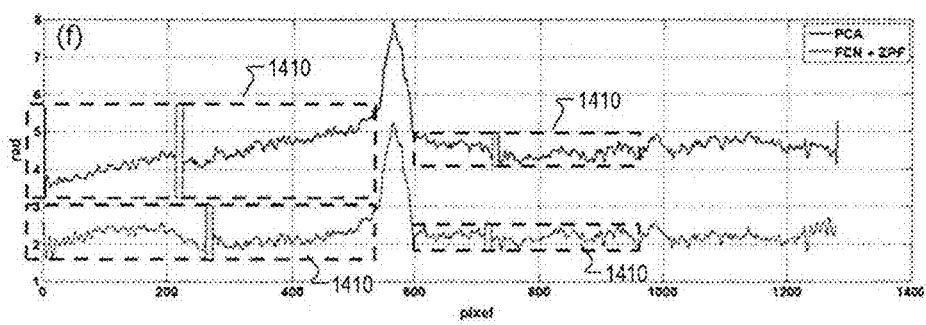

FIG. 14C shows the profiles of a diagonal dashed line (from bottom left to top right) of PCA's result of schematic 1402 and CNN+ZPF's result of schematic 1406. The two profiles have different bias phases; the background phase of CNN+ZPF has better flatness (1.35 rad and 0.65 rad) than PCA's background (corresponding to 2.4 rad and 0.95 rad) which can be seen inside the areas indicated by 1410.

Figure 15:
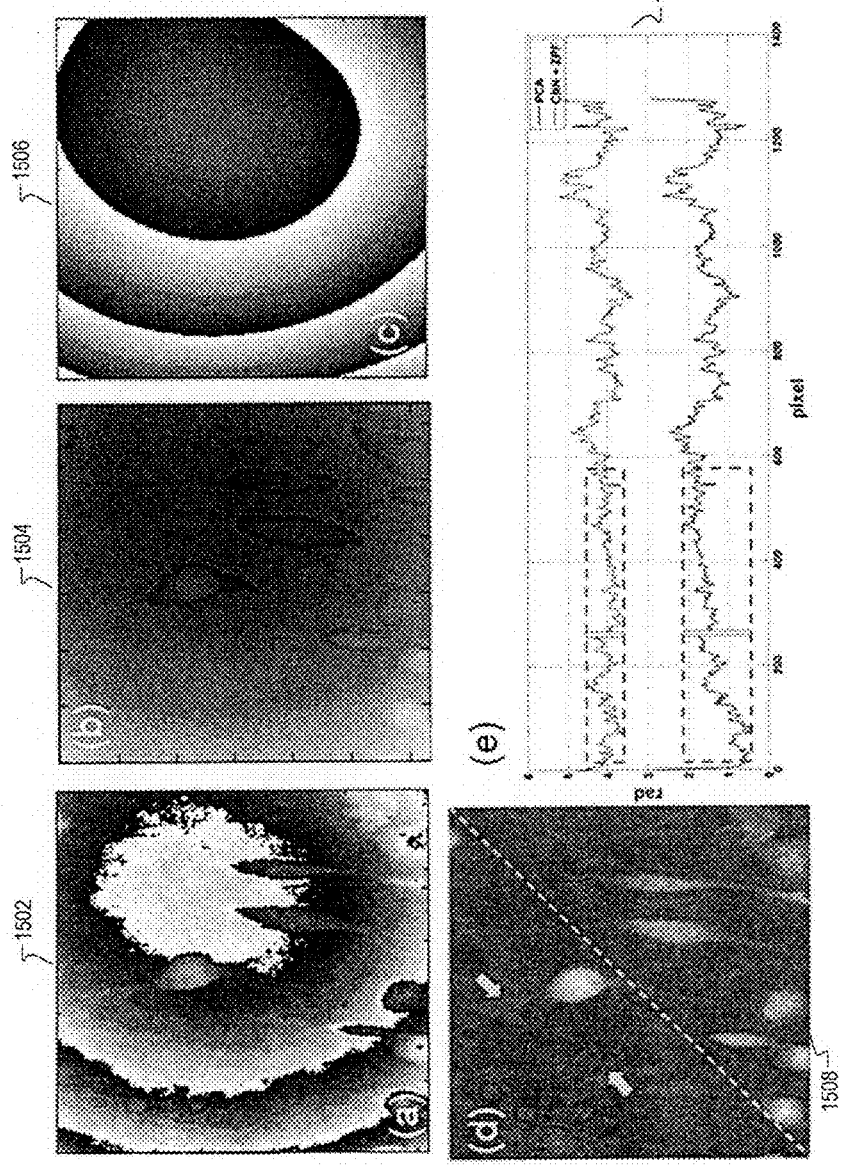
FIG. 15 is a schematic that shows exemplary results according to one example.

Another example of testing data is shown in FIG. 15. The same cancer cell line was used, but cells were adherent to the surface of a thin collagen hydrogel layer. MDA-MB-231 cells were placed on a collagen layer, fed with Dulbecco's Modified Eagle Medium (DMEM) supplemented by 10% Fetal Bovine Serum (FBS) and incubated for one day to promote adhesion to collagen. Collagen polymerization conditions, at a concentration of 4 mg/ml, and polymerization temperature of 4° C., were set to produce a collagen network with large-diameter fibers. The microscope stage was warmed to 37° C. with a stage warmer, and cell culture media was buffered with 10 mM of hydroxyethyl piperazineethanesulfonic acid (HEPES). The system described herein is able to capture phase reconstruction map features consistent with collagen fibers from gels formed at the above polymerization conditions.

Due to the different temperatures during collagen polymerization (37° C. versus 4° C.), one image in the new dataset has collagen fiber features not apparent in the CNN model training imageset. However, the background region is correctly detected even with the introduction of the new features. Thus, the CNN+ZPF technique has higher accuracy in measuring the phase aberration (1.68 rad of flatness using PCA and 0.92 rad of flatness using CNN+ZPF) as shown in trace 1510. Schematic 1502 shows the phase aberration. Schematic 1504 shows a CNN's binary mask where background is fed into ZPF. Schematic 1506 shows a conjugated residual phase using CNN+ZPF. Schematic 1508 shows fibers after aberration compensation (the fibers are indicated by arrows). Schematic 1510 shows the phase profile along the dash line of schematic 1508. The bars denote the flatness of region of interest.

Figure 16:
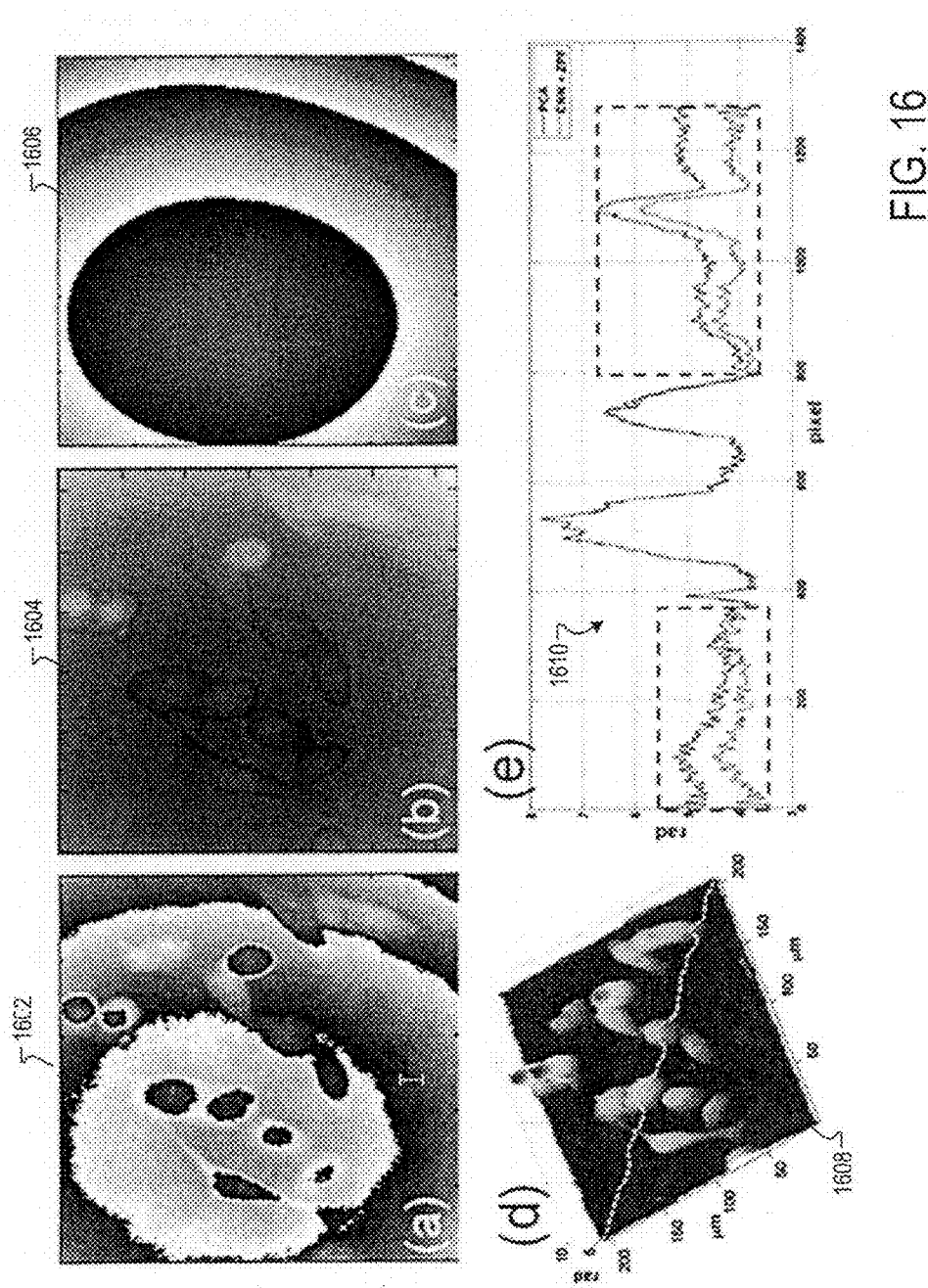
FIG. 16 is a schematic that shows exemplary results according to one example.

To further validate the system and methodologies described herein, a dataset with more cancer cells than the training images in the CNN model was used (i.e., the training dataset contains 4-10 cells in a single-phase image). FIG. 16 shows a typical result with a real phase image containing 15 cells. The CNN model managed to detect the background area regardless of the number of cells that appear in the image. The CNN model managed to learn representations and make decisions based on local spatial input. By scanning kernel filters spatially over the data volume, convolutional layers could detect cells' region features spatially better suited to enhance the ZPF performance, resulting in better phase aberration compensation. In trace 1610 the dashed profile crosses 3 different cells, from left to right. The phase heights of the three cells are the same for both techniques. While the phase aberration remains visible for the $3^{rd}$ cell using PCA, the aberration is cancelled using the proposed technique. The whole motivation is to ensure proper cell phase visualization for further analysis, without a phase offset error. Thus, ensuring flat phase in the background is crucial for correct analysis. Hence, the CNN+ZPF is a fully automatic technique that outperforms the PCA method in terms of accuracy and robustness, and can be implemented in real time. Schematic 1602 shows the phase aberration. Schematic 1604 shows the CNN's binary mask where background is fed into ZPF, Schematic 1606 shows the conjugated residual phase using CNN+ZPF. Schematic 1608 shows the 3D phase after compensation.

The digital holographic microcopy system and associated methodology described herein automatically compensate for the phase aberration using a combination of Deep Learning Convolutional Neural Network with Zernike polynomial fitting technique. The technique benefits from PCA's ability to obtain the training data for the deep learning CNN model. The trained CNN model can be used as an automatic and in situ process of background detection and full phase aberration compensation. The CNN model described herein detects the background with a high precision. While, many image segmentation techniques are not robust when applied to DHM images due to the overwhelming phase aberration, CNN segments the background spatially based on features regardless to the number of cells and their unknown positions. Thus, the trained CNN technique in conjunction with the ZPF technique is a very effective tool that can be employed in real time for autonomous phase aberration compensation in a digital holographic microscopy system.

In one implementation, a fully automatic method to obtain aberration free quantitative phase imaging in Digital Holographic Microscopy (DHM) based on deep learning is provided. The method combines a supervised deep learning technique with Convolutional Neural Network (CNN) and Zernike polynomial fitting (ZPF). The deep learning CNN is implemented to perform automatic background region detection that allows for ZPF to compute the self-conjugated phase to compensate for most aberrations.

Figure 17:
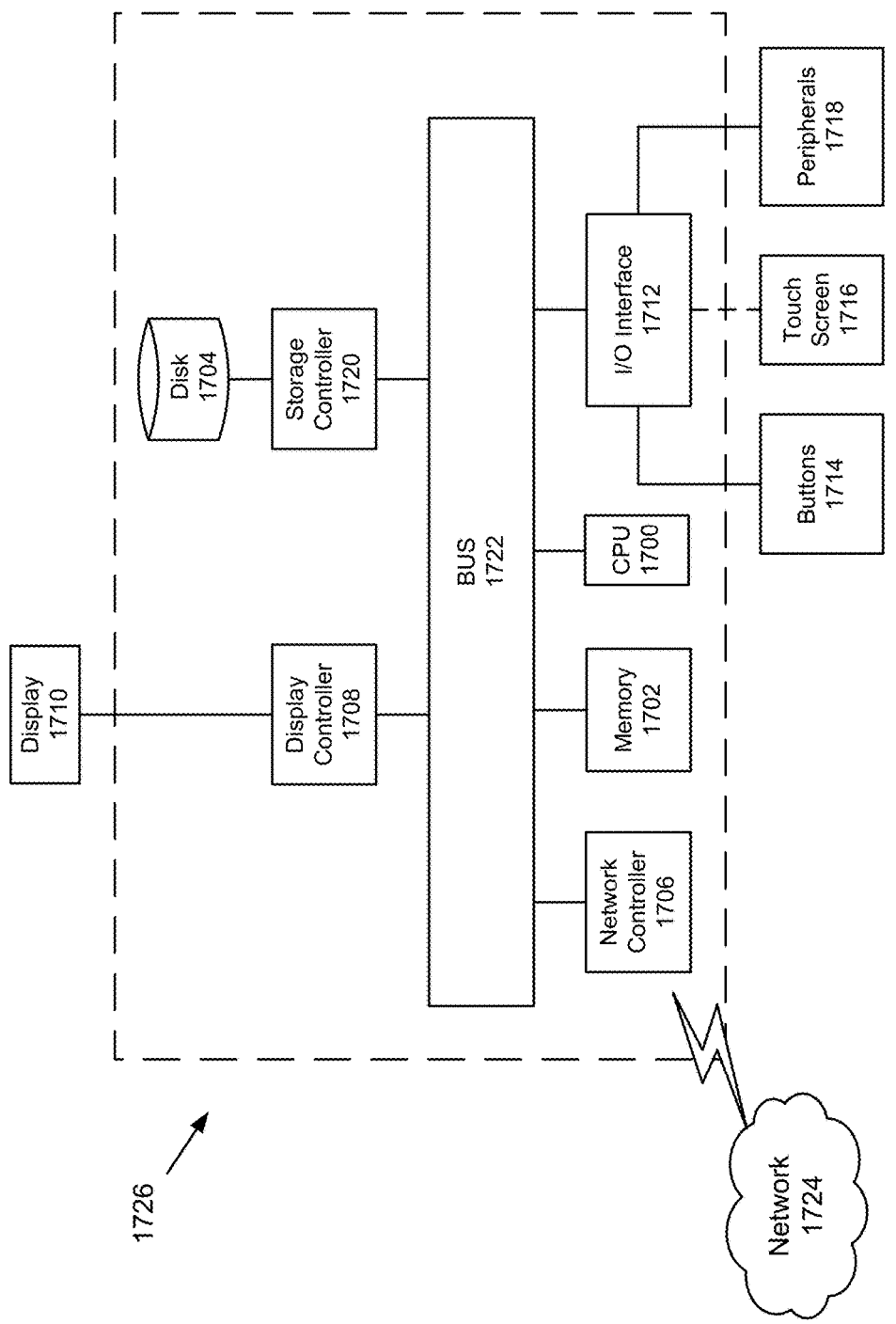
FIG. 17 is an exemplary block diagram of a server according to one example.

In one implementation, the functions and processes of the processor 134 may be implemented by a computer 1726. Next, a hardware description of the computer 1726 according to exemplary embodiments is described with reference to FIG. 17. In FIG. 17, the computer 1726 includes a CPU 1700 which performs the processes described herein. The process data and instructions may be stored in memory 1702. These processes and instructions may also be stored on a storage medium disk 1704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1726 communicates, such as a server or computer.

Further, the claimed advancements may be provided as a utility application, background daemon, or component of an operating system, or combination thereof, executing in conjunction with CPU 1700 and an operating system such as Microsoft® Windows®, UNIX®, Oracle® Solaris, LINUX®, Apple macOS® and other systems known to those skilled in the art.

In order to achieve the computer 1726, the hardware elements may be realized by various circuitry elements, known to those skilled in the art. For example, CPU 1700 may be a Xenon® or Core® processor from Intel Corporation of America or an Opteron® processor from AMD of America, or may be other processor types that would be recognized by one of ordinary skill in the art. Alternatively, the CPU 1700 may be implemented on an FPGA, ASIC, PLD or using discrete logic circuits, as one of ordinary skill in the art would recognize. Further, CPU 1700 may be implemented as multiple processors cooperatively working in parallel to perform the instructions of the inventive processes described above.

The computer 1726 in FIG. 17 also includes a network controller 1706, such as an Intel Ethernet PRO network interface card from Intel Corporation of America, for interfacing with network 1724. As can be appreciated, the network 1724 can be a public network, such as the Internet, or a private network such as LAN or WAN network, or any combination thereof and can also include PSTN or ISDN sub-networks. The network 1724 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1726 further includes a display controller 1708, such as a NVIDIA® GeForce® GTX or Quadro® graphics adaptor from NVIDIA Corporation of America for interfacing with display 1710, such as a Hewlett Packard® HPL2445w LCD monitor. A general purpose I/O interface 1712 interfaces with a keyboard and/or mouse 1714 as well as an optional touch screen panel 1716 on or separate from display 1710. General purpose I/O interface also connects to a variety of peripherals 1718 including printers and scanners, such as an OfficeJet® or DeskJet® from Hewlett Packard®.

The general purpose storage controller 1720 connects the storage medium disk 1704 with communication bus 1722, which may be an ISA, EISA, VESA, PCI, or similar, for interconnecting all of the components of the computer 1726. A description of the general features and functionality of the display 1710, keyboard and/or mouse 1714, as well as the display controller 1708, storage controller 1720, network controller 1706, and general purpose I/O interface 1712 is omitted herein for brevity as these features are known.

The features of the present disclosure provide a multitude of improvements in the technical field of digital microscopy. In particular, the controller may remove aberrations from the collected samples. The methodology described herein could not be implemented by a human due to the sheer complexity of data, gathering and calculating and includes a variety of novel features and elements that result is significantly more than an abstract idea. The methodologies described herein are more robust to inaccuracies. The method described herein may be used for early cancer detection. Thus, the implementations described herein improve the functionality of a digital microscope by mitigating aberrations in the acquired images. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

A non-transitory computer readable medium storing computer-readable instructions therein which when executed by a computer cause the computer to perform a method for capturing an image using digital holography, the method comprising:

depositing a sample in a sample holder of a digital holography microscope having two microscope objectives in a bi-telecentric configuration;

capturing one or more images using the couple charged device of the digital microscope;

retrieving a Convolutional Neural Network (CNN) model associated with a type of the sample;

mitigating aberrations in the one or more images using at least the CNN model having as input an unwrapped phase associated with each of the one or more images; and outputting the mitigated one or more images via a display of the digital holography microscope.

The invention claimed is:

1. A digital holography microscope comprising:
two microscope objectives configured in a bi-telecentric configuration;
a sample holder configured to receive a sample;
a couple charged device configured to capture one or more images;
a display; and
a processor configured to
retrieve a Convolutional Neural Network (CNN) model associated with a type of the sample,
mitigate aberrations in the one or more images using at least the CNN model having as input an unwrapped phase associated with each of the one or more images, and
output the mitigated one or more images via the display.

2. The digital holography microscope of claim 1, wherein an output of the CNN model is a background image.

3. The digital holography microscope of claim 1, wherein the mitigating step further includes:
obtain the Fourier transform of each of the one or more images;
determine a phase of the one or more images in the Fourier domain;
unwrap the phase of each of the one or more images;
input the unwrapped phase to the CNN model;
combine the unwrapped phase and the output of the CNN model to obtain background phase information, the output of the CNN model being a background image;
determine a conjugated phase aberration based on the background phase information;
compensate the conjugated phase aberration; and
determine an aberration-free image based on at least the compensated conjugated phase aberration.

4. The digital holography microscope of claim 3, wherein compensating the phase includes:
multiply in a spatial domain a first term associated with the conjugated phase aberration with an inverse Fourier transform of a first order spectrum associated with the image.

5. The digital holography microscope of claim 4, wherein the processor is further configured to:
determine the conjugated phase aberration using Zemike polynomial fitting.

6. The digital holography microscope of claim 5, wherein the determining the aberration free image further includes applying an angular spectrum reconstruction technique on a compensated image associated with the compensated phase to obtain an aberration-free reconstructed image.

7. The digital holography microscope of claim 3, wherein the processor is further configured to:
unwrap the aberration-free reconstructed image.

8. The digital holography microscope of claim 1, wherein the CNN model includes a ground truth and training data associated with the type of the sample.

9. A method for image acquisition, the method comprising:
depositing a sample in a sample holder of a digital holography microscope having two microscope objectives in a bi-telecentric configuration;
capturing one or more images using the couple charged device of the digital microscope;
retrieving, using processing circuitry, a Convolutional Neural Network (CNN) model associated with a type of the sample;
mitigating, using the processing circuitry, aberrations in the one or more images using at least the CNN model having as input an unwrapped phase associated with each of the one or more images; and
outputting the mitigated one or more images via a display of the digital holography microscope.

10. The method of claim 9, wherein an output of the CNN model is a background image.

11. The method of claim 9, wherein the mitigating step further includes:
obtaining the Fourier transform of each of the one or more images;
determining a phase of the one or more images in the Fourier domain;
unwrapping the phase of each of the one or more images;
inputting the unwrapped phase to the CNN model;
combining the unwrapped phase and the output of the CNN model to obtain background phase information, the output of the CNN model being a background image;
determining a conjugated phase aberration based on the background phase information;
compensating the conjugated phase aberration; and
determining an aberration-free image based on at least the compensated conjugated phase aberration.

12. The method of claim 11, wherein compensating the phase includes:
multiplying in a spatial domain a first term associated with the conjugated phase aberration with an inverse Fourier transform of a first order spectrum associated with the image.

13. The method of claim 12, further comprising:
determining the conjugated phase aberration using Zemike polynomial fitting.

14. The method of claim 11, wherein the determining the aberration free image further includes applying an angular spectrum reconstruction technique on a compensated image associated with the compensated phase to obtain an aberration-free reconstructed image.

15. The method of claim 14, further comprising:
unwrapping the aberration-free reconstructed image.

16. The method of claim 9, wherein the CNN model includes a ground truth and training data associated with the type of the sample.

17. A system comprising:
a digital holography microscope including:
two microscope objectives in a bi-telecentric configuration,
a couple charged device configured to capture one or more images of a sample, and
a display; and
a processor configured to
retrieve a Convolutional Neural Network (CNN) model associated with a type of the sample,
mitigate aberrations in the one or more images using at least the CNN model having as input an unwrapped phase associated with each of the one or more images, and
output the mitigated one or more images via the display.

* * * * *